May 29, 1956
G. NEVRINCEAN
2,747,438
DRILL TEMPLATE HAVING A CIRCULAR SAW
FOR CUTTING HOLES IN PIECE PARTS
Filed Oct. 22, 1952
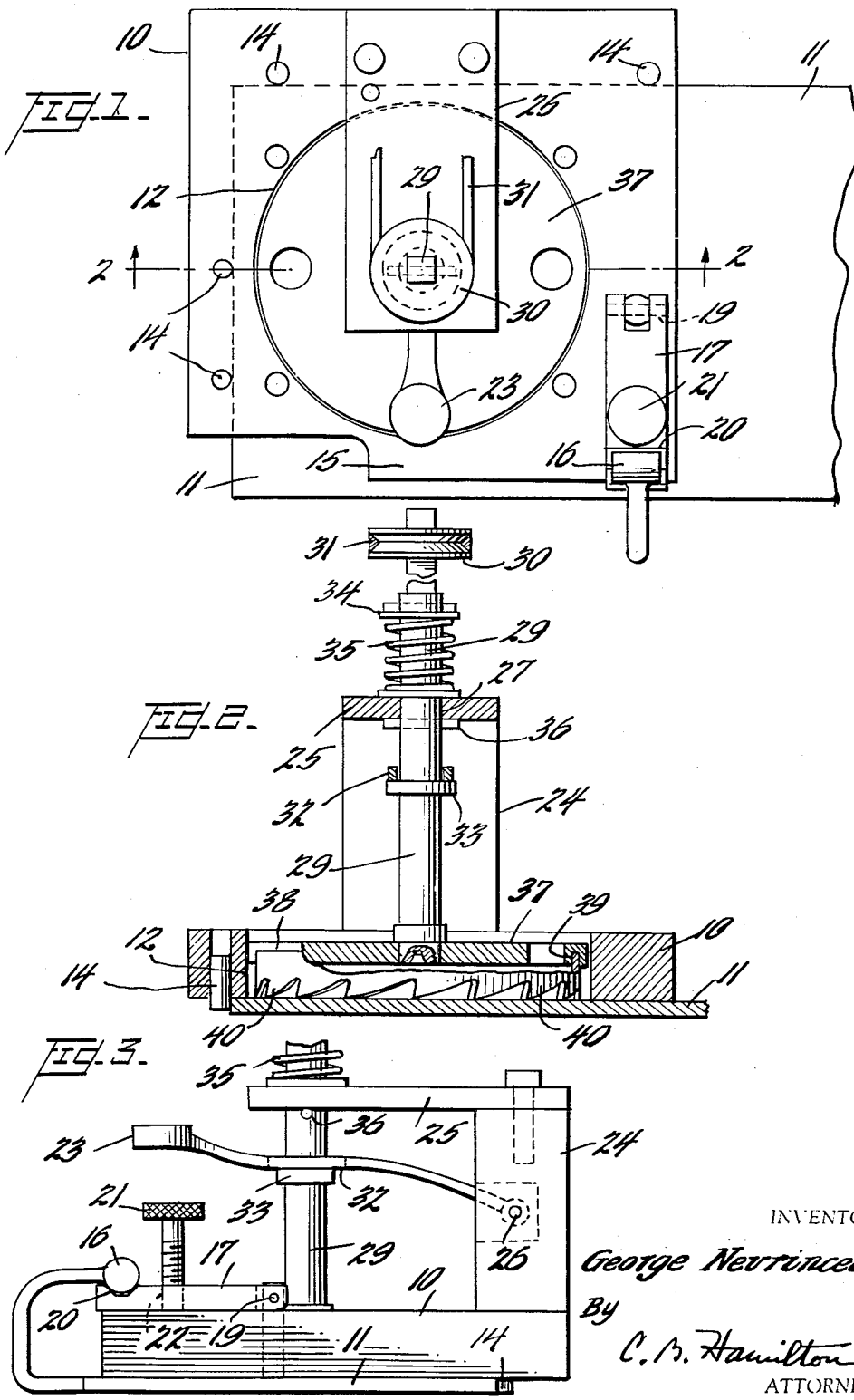
INVENTOR
George Nevrincean,
By
C. B. Hamilton
ATTORNEY

United States Patent Office 2,747,438
Patented May 29, 1956

2,747,438

DRILL TEMPLATE HAVING A CIRCULAR SAW FOR CUTTING HOLES IN PIECE PARTS

George Nevrincean, Winston-Salem, N. C., assignor to Western Electric Company, Incorporated, New York, N. Y., a corporation of New York Application October 22, 1952, Serial No. 316,154

8 Claims. (Cl. 77—13)

This invention relates to cutting templates and more particularly to a template having a circular saw for cutting an arcuate slot or hole in a work piece held in a predetermined position.

An object of this invention is to provide a quickly operable template and cutter for accurately locating and cutting a circular or arcuate slot in a work piece.

Another object of this invention is to provide an efficient clamping means to retain the template in a predetermined position on the work piece to accurately guide the cutter.

With these and other objects in view, the invention comprises a template base plate having a circular guide aperture therein, a circular saw reciprocably and rotatably mounted in the guide aperture, means to rotate said circular saw, means to reciprocate said saw into and out of engagement with a work piece to be cut, resilient means to normally urge said saw away from said work piece, a plurality of locating pins depending from said template base for locating said saw in a predetermined position on the piece to be cut, a protruding portion of said template base extending underneath a projecting member or handle of the work piece to be cut, a clamping arm, and means to move said clamping arm away from the protruding portion of the base of said template and into contact with the projecting member of the work piece to securely clamp the template to said work piece.

Other features and advantages of this invention will become apparent from the following detailed description, when taken in conjunction with the accompanying drawings, in which:

Fig. 1 is a plan view of a template and cutter embodying the features of the invention and shown operatively secured to a work piece to be cut;

Fig. 2 is a vertical section of the cutter template taken along line 2—2 of Fig. 1, and Fig. 3 is a side view of this combination template showing the means for clamping the template to a predetermined work piece to be cut.

Referring now to the drawings, wherein like reference numerals designate the same elements throughout the several views, a template base plate 10 is positioned on a work piece 11 and has therein a circular aperture 12. A plurality of locating pins 14 depend from the base 10 and are in engagement with two sides of the work piece 11 thereby positioning the circular aperture 12 in a desired predetermined position relative to the work piece 11. These locating pins 14 are also adapted to enter apertures placed in predetermined positions in a work piece or part to be cut. A protruding tongue portion 15 of the template base plate 10 extends underneath a handle 16 of the work piece 11. A clamping arm 17 is pivotally attached to the base 10 by a pin 19 and rests on the upper surface of the protruding tongue portion 15. A groove 20 in the upper surface of the clamping arm 17 receives the handle 16 of the work piece 11 when the clamping arm 17 is moved upwardly into engagement therewith by a thumb screw 21 which is threadably engaged in the clamping arm 17 and has its lower end 22 in contact with the upper surface of the base 10.

An upwardly extending supporting block 24 is secured to the base 10 and has attached to its upper end a horizontal guide bracket 25 which extends over the circular aperture 12 in the template base 10. The guide bracket 25 has therein a circular guiding aperture 27 whose axis is coincident with the axis of the circular aperture 12 in the base 10. A shaft 29 is rotatably and reciprocably mounted in the guiding aperture 27 and is rotated by the pulley 30 and belt drive 31. The shaft 29 is reciprocated by the movement of an arm 23 pivoted at 26 on the upright 24 and having a bifurcated portion 32 engaging a shoulder 33 on the shaft. A helical spring 35 is mounted concentrically on the shaft 29 and has its lower end in contact with the top surface of the guide bracket 25 and its upper end in engagement with a retaining collar 34 on the shaft so that this spring normally urges the shaft 29 upwardly away from the template base 10. A limiting pin 36 is mounted in a shaft 29 below the guide bracket 25 and restricts the upward movement of the shaft 29 produced by the spring 35. The lower end of the shaft 29 has attached thereto a saw holder 37. A projecting saw blade 38 with depending teeth is mounted in a circular groove 39 in the lower part of the saw holder 37. The outer rim of the saw holder is in engagement with the internal wall of the guiding aperture 12 in the base 10 whereby the holder 37 accurately guides the saw into engagement with the work piece 11 to be cut when the shaft 29 is moved downward by the arm 23.

In operation, the combined template and saw holder is placed on the work piece 11 with the tongue portion 15 of the template base plate 10 positioned under the handle 16 of the work piece and with the locating pins 14 in engagement with the sides of the work piece 11. The knurled thumb screw 21 is then turned clockwise to move the clamping arm 17 upwardly into engagement with the underside of the handle 16 to secure the template in a desired predetermined position on the work piece 11. The shaft 29 is then rotated by the pulley 30 and the drive belt 31 driven by any suitable power source or the shaft 29 may be rotated manually through any suitable mechanism. Then the arm 23 is moved downwardly to bring the rotating saw blade 38 into engagement with the upper surface of the work piece 11. Thus the operator observes and controls the downward movement of the saw 38; however the retaining collar 34 and spring 35 prevent the saw blade 38 from exceeding a predetermined limit of travel. After the saw cuts through the work 11, the arm 23 is released and the saw blade automatically returns to its normal position due to the moving force of the compressed spring 35.

The work piece 11 is then quickly removed from under the circular saw 38 by turning screw 21 to release the clamp 17. Another part to be cut is positioned under the template 10 and clamped to it to then cut out either arcuate portions or complete cylindrical portions.

It is to be understood that the above-described disclosure is simply illustrative of the principles of the invention and many other modifications may be readily devised by those skilled in the art which will embody

What is claimed is:

1. In a combined template and work-cutter, a base having a circular aperture therein, locating pins depending from said base for engaging a work-piece to be cut to locate said circular aperture in a predetermined position over said work-piece, a shaft rotatably and reciprocably mounted on said base and having its axis coincident with the axis of said circular aperture, a saw attached to said shaft and reciprocable in said circular aperture and threadedly adjustable pivoted means for clamping said base to a projecting portion of said work-piece overhanging said base to retain said aperture and the saw in said predetermined position over the work-piece.

2. In a combined template and cutter for overlying the work to be cut, a base having a circular aperture therein, means for positioning said base on a work-piece to be cut so that said circular aperture is in a predetermined position relative to the work to be cut, a rotatable shaft mounted on said base for reciprocation centrally of said circular aperture, a circular saw attached to said shaft and reciprocable in said circular aperture, said base having a protruding tongue portion positioned under a projecting portion of the work-piece, a clamping arm pivotally mounted on said base and having its lower surface normally in engagement with the upper surface of said protruding tongue portion, means for moving said clamping arm away from said protruding tongue portion and into engagement with said projecting member to clamp said template base to said work-piece, and means to reciprocate said shaft so that said saw is moved into and out of engagement with the work-piece.

3. In a combined template and work-cutter, a base having a circular aperture in a predetermined location therein, means for positioning the base with its circular aperture in a predetermined position on a work-piece to be cut, a clamping arm pivotally mounted on the base and pivotally engageable with a complementary projecting portion of the positioned work-piece for clamping said base in said predetermined position, a supporting block mounted on said base, a guide bracket attached to the upper end of said supporting block and extending over said circular aperture, said guide bracket having a guiding aperture therein whose axis is coincident with the axis of said circular aperture in the base, a shaft rotatably and reciprocably mounted in said guiding aperture in the bracket and having an end extending into said circular aperture in the base, a circular saw attached to said end of said shaft and movable in said circular aperture, resilient means normally urging the shaft away from the work-piece, means to limit the distance of movement of said shaft away from said work-piece, means to rotate said shaft, and means to reciprocate said shaft so that the saw is moved into and out of engagement with the said work-piece.

4. In a combined template and work-cutter, a base having a circular aperture therein and overlying the work to be cut, locating pins depending from said base and in engagement with the sides of the work-piece to be cut so that said circular aperture in the base is located in a predetermined position relative to said work-piece, a protruding tongue portion of said base extending into a projecting member attached to said work-piece, a clamping arm pivotally mounted on said base and resting in part on the upper surface of said protruding tongue portion, a thumb screw threadably engaged in an aperture in said clamping arm for moving the arm upward into engagement with said projecting member of said work-piece to clamp the base in said desired predetermined position on the work-piece, a guide bracket mounted on the base and extending over the said circular aperture, a rotatable shaft passing through an aperture in said guide bracket and reciprocable therein, one end of said rotatable shaft extending into said circular aperture in the base, a saw mounted on said end of the shaft and movable in said aperture, resilient means for normally urging the saw away from the work-piece, means for limiting the movement imparted to said shaft by said resilient means, means for rotating the shaft, and means for moving the shaft and saw downward to cut an arcuate slot in the work-piece.

5. In a combined template and cutter for cutting an arcuate slot in a predetermined location in a work-piece having a projecting handle, a base having a circular aperture therein and overlying the work to be cut, locating pins depending from said base and engaging predetermined parts of the work-piece to be cut to position said base in a desired location thereon, said base having a protruding tongue portion that is positioned under a handle attached to the work-piece, a clamping arm pivotally mounted on said base and having a groove in the upper surface thereof for receiving the said handle, a screw threaded into and having an extending lower end in contact with the upper surface of said base for moving said clamping arm away from said base and into engagement with said handle to clamp said base in said desired relation on the work-piece, an upright block mounted on said base, a guide bracket attached to the upper end of said block and extending over said circular aperture, said guide bracket having a circular guiding aperture therein whose axis coincides with the axis of said circular aperture in the base, a shaft reciprocably and rotatably mounted in said guide aperture and in said circular aperture in the base, means for rotating the shaft, means for longitudinally moving said shaft, a retaining pin extending through said shaft above said guide bracket, a spring mounted on said shaft having one end supported by said guide bracket and the other end thereof engaging the protruding ends of the said retaining pin to thereby normally urge said shaft away from said base, a limiting pin extending through said shaft below said guide bracket for restraining the upward movement of said shaft caused by said spring, a saw-holder mounted on an end of said shaft and having a circular groove in the lower surface thereof, a saw-blade mounted in said circular groove and having its teeth depending from the lower surface of the saw-holder, the outer rim of said saw-holder being in engagement with the internal wall of said circular aperture in the base for guiding said saw-blade into engagement with the work-piece when said shaft is longitudinally moved by said moving means to cut a circular hole in said work-piece in a predetermined desired position.

6. A combined template and work cutter comprising a base having a circular aperture therein, a circular saw reciprocably and rotatably mounted in said circular aperture, means for positioning said base and saw at a predetermined location on a work-piece to be cut, and vertically adjustable pivoted means mounted on said base for clamping said base to a portion of said work-piece overhanging said base and complementary in configuration to said clamping means.

7. A combined template and cutter comprising a base having a circular aperture therein, means for positioning said base relative to a work-piece having a projecting portion thereof spaced above the positioned base, a shaft rotatably and reciprocably mounted on said base and concentrically aligned with said aperture, a circular saw attached to said shaft and slidably movable within said aperture, a clamping arm pivotally mounted on said base adjacent an upper surface thereof and below the projecting portion of said work-piece, means for moving said clamping arm into clamping engagement with said projecting portion of said work-piece, and means to actuate said shaft.

8. A combined template and cutter comprising a base having a circular aperture therein, means for positioning said base relative to a work-piece having a projecting portion thereof spaced above the positioned base, a shaft rotatably and reciprocably mounted on said base centrally of said aperture, resilient means to force said shaft in a direction away from said work-piece, means to reciprocate said shaft against the force of said resilient means and toward said work-piece, a circular saw attached to said shaft and slidably movable within said aperture, clamping means mounted on said base below said projecting portion of said work-piece, means for moving said clamping means into clamping engagement with said projecting portion of said work-piece, and means to rotate said shaft.

References Cited in the file of this patent

UNITED STATES PATENTS

| | | |
|---|---|---|
| 507,210 | Buchholz | Oct. 24, 1893 |
| 592,007 | Howe | Oct. 19, 1897 |
| 755,528 | Newton | Mar. 22, 1904 |
| 784,041 | Ford | Mar. 7, 1905 |
| 1,232,926 | Johnson | July 10, 1917 |
| 2,306,807 | Hulvey et al. | Dec. 29, 1942 |

FOREIGN PATENTS

| | | |
|---|---|---|
| 158,482 | Germany | Feb. 16, 1905 |